United States Patent
Michioka et al.

(10) Patent No.: US 6,733,179 B2
(45) Date of Patent: May 11, 2004

(54) ROLLING ELEMENT INTERFERENCE PREVENTER AND A GUIDE DEVICE

(75) Inventors: Hidekazu Michioka, Tokyo (JP); Katsuya Iida, Yamanashi (JP); Tomozumi Murata, Tokyo (JP); Yoshiyuki Honjyo, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 10/212,093

(22) Filed: Aug. 6, 2002

(65) Prior Publication Data

US 2003/0035600 A1 Feb. 20, 2003

(30) Foreign Application Priority Data

Aug. 7, 2001 (JP) ................................... P.2001-239592

(51) Int. Cl.⁷ .............................................. F16C 29/06
(52) U.S. Cl. .......................................... 384/44; 384/45
(58) Field of Search .......................... 384/45, 44, 43, 384/48, 54, 576, 527

(56) References Cited

U.S. PATENT DOCUMENTS 5,893,647 A    4/1999 Mochizuki ................... 384/51
6,352,366 B1   3/2002 Schneeberger et al. ....... 384/45

FOREIGN PATENT DOCUMENTS

| EP | 0 296 538    | 12/1988 |
| EP | 0 644 344 A1 | 3/1995  |
| EP | 0 992 696 A1 | 4/2000  |
| GB | 2 102 513 A  | 2/1983  |
| JP | 5-126149     | 5/1993  |

OTHER PUBLICATIONS

British Search Report dated Feb. 5, 2003.

*Primary Examiner*—Leonard A. Footland
(74) *Attorney, Agent, or Firm*—Westerman, Hattori, Daniels & Adrian, LLP

(57) ABSTRACT

A rolling element interference preventer for a guide device prevents a number of rolling elements rolling at regular intervals in a continuous circulation path of the guide device from interfering with each other. The rolling element interference preventer is formed of a thermoplastic resin elastomer having a physical property in accordance with an expression, $(A \times B) \div C \geq 18$, where A represents a 10% elongation stress, B represents a tensile strength, and C represents a bending modulus of elasticity.

9 Claims, 8 Drawing Sheets

ROLLING ELEMENT INTERFERENCE PREVENTER AND A GUIDE DEVICE

BACKGROUND OF THE INVENTION

1. Field of the Invention

The present invention relates to a rolling element interference preventer for a guide device, such as a linear guide device having an continuous circulation path for rolling elements, a swing bearing, a ball screw, and a spline. The rolling element interference preventer prevents the rolling elements rolling at regular intervals within the continuous circulation path formed between a pair of bearing races from interfering with each other.

2. Description of the Related Art

In various rolling guide devices having a bearing, a linear motion or rotation of a pair of bearing races is enabled by use of the rolling motion of rolling elements consisting of balls or rollers carried between the bearing races. To reduce the frictional resistance by avoiding the contact between each rolling element and to produce the smooth motion by arranging each rolling element at predetermined position, it is common practice that a number of rolling elements are incorporated between bearing races, using a metallic retainer.

In the conventional guide device using the metallic retainer, since a cage has a number of pockets and rolling elements are put rotatably into these pockets, there is an advantage that the operation of incorporating a number of rolling elements into the guide device is facilitated. However, it is required to hold a number of rolling elements incorporated into the pockets of the cage not to fall off, resulting in a problem that it takes a lot of time to fabricate the cage itself.

Thus, to solve this problem, a ball interference preventer (rolling element interference preventer) for use in a guide device to prevent interference between each ball has been proposed. The endless guide device includes a track rail having a rolling path, a sliding board having a rolling groove mutually opposed to the rolling path and moving along the track rail, and a number of balls (rolling elements). With a load applied, the balls roll in a continuous circulation path formed between the rolling path of the track rail and the rolling groove of the sliding board. The ball interference preventer is composed of a flexible resin connector having an interposing portion interposed between each ball and a connecting portion for connecting between the interposing portions, and holding each ball in an arranged state and rollably. Thereby, many appreciable results were achieved including 1) attaining low noise and good sound quality by removing the metallic sound due to collision between the balls (low noise), 2) reducing the wear of ball and increasing the retention of grease (maintenance free for long term), 3) attaining excellent high speed by decreasing the relative friction velocity (high speed), and 4) smoothing the motion by greatly reducing the rolling fluctuation (sliding property) (JP-B-6-56181, JP-A-5-52217, JP-A-5-126149, JP-A-5-196036, JP-A-5-196037, and JP-A-9-14264).

By the way, thus structured ball interference preventer composed of the resin connector is immersed in, or subjected to grease, lubricating oil, or coolant in the environment where the preventer is incorporated in the circulation path for the rolling guide device. Also, the ball interference preventer undergoes actions such as bending, tension, compression, twisting, or contact friction with the ball at any time. When reciprocated in the circulation path at high speed, this ball interference preventer undergoes an operation of bending, tension and compression severely and repeatedly. Further, when the ball interference preventer composed of the resin connector is immersed in, or subjected to grease, lubricating oil, or coolant, it absorbs water and oil to swell, causing a circulation failure in the circulation path and ablation of the preventer, and degrading the durability, sliding property and wear resistance.

Therefore, the rolling element interference preventer composed of the resin connector is required to have the excellent chemical strength of oil resistance, water resistance, and chemical resistance to the grease, lubricating oil and coolant, in addition to the mechanical strength of durability, sliding property and wear resistance. In view of the life of the guide device, it is required to be so durable and resistant to wear as to run about 30,000 km or more, with small sliding resistance variation, as well as resistant to oil, water and chemicals.

Moreover, the rolling element interference preventer composed of the resin connector was not too problematical in that an unnatural load was applied only on a part of the resin connector during the use, because the minimum radius of curvature for the continuous circulation path formed in the guide device was relatively large, the ball was employed as the rolling element, and the shape of the resin connector was devised. In recent years, however, the guide device is demanded for smaller size and higher speed, and the roller is employed as the rolling element, resulting in a problem that the durability, wear resistance and sliding property may be impaired.

SUMMARY OF THE INVENTION

The present inventors made researches to attain more excellent durability and wear resistance without impairing various features (low noise, maintenance free for long term, high speed, and sliding property) of the rolling element interference preventer, especially when subjected to severe and repetitive actions of bending, tension and compression, and found that the rolling element interference preventer should be produced using a thermoplastic resin elastomer having specific balance (relation) for a 10% elongation stress, a tensile stress and a bending modulus of elasticity to achieve the aim, thus completing this invention.

Accordingly, it is an object of the invention to provide a rolling element interference preventer for a guide device, which prevents a number of rolling elements rolling at regular intervals in a continuous circulation path of the guide device from interfering with each other. The rolling element interference preventer is not only excellent in low noise, maintenance free for long term, high speed and sliding property, but also excellent in durability and wear resistance, and can be used stably over the long term.

The present invention provides a rolling element interference preventer for a guide device to prevent a number of rolling elements rolling at regular intervals in a continuous circulation path of the guide device from interfering with each other, wherein the rolling element interference preventer is formed of a thermoplastic resin elastomer having a physical property in accordance with an expression, $(A \times B) \div C \geq 18$, where A is a 10% elongation stress, B is a tensile strength, and C is a bending modulus of elasticity.

As the thermoplastic resin elastomer, polyamide resin elastomer, polyester resin elastomer, polyurethane resin elastomer, styrene resin elastomer, and olefine resin elastomer are exemplified. They should be highly resistant to oil, water and chemicals in the service environment of the rolling guide device, especially in the service environment where the guide device is immersed in, or subjected to grease, lubricating oil, or coolant. The coefficient of water absorption measured in the environment of equilibrium moisture percentage 23° C., 65% RH is 1.5 wt % (% by weight) or less, and preferably 0.5 wt % or less. The swelling factor measured in an immersion test of chemical at a temperature of 85° C. for 672 hours is 3% or less. Furthermore, the tensile strength retention in an immersion test of boiling water at 100° C. is 70% or more after ten days, and preferably 80% or more.

In this invention, the thermoplastic resin elastomers satisfying a physical property in accordance with the expression, $(A \times B) \div C \geq 18$ (A: 10% elongation stress, B: tensile strength, and C: bending modulus of elasticity) are employed. Though slightly different depending on the type of the rolling guide device and whether the rolling element is a ball or a roller, the 10% elongation stress A is from 60 to 200 $kgf/cm^2$, and preferably from 90 to 160 $kgf/cm^2$, the tensile strength B is from 340 to 460 $kgf/cm^2$, and preferably from 360 to 430 $kgf/cm^2$, and the bending modulus of elasticity C is from 1000 to 5000 $kgf/cm^2$, and preferably from 1200 to 2700 $kgf/cm^2$.

If the 10% elongation stress of the thermoplastic resin elastomer is not less than 60 $kgf/cm^2$, the shape of the rolling element interference preventer is maintained against a centrifugal force acting on the rolling element of the guide device in the fast operation, resulting in that the sliding resistance decreases in the continuous circulation path of the guide device. On the contrary, if it is not more than 200 $kgf/cm^2$, a problem of flexure fatigue failure is prevented. If the tensile strength is not less than 340 $kgf/cm^2$, the durability is increased, or conversely if it is not more than 460 $kgf/cm^2$, the problem of flexure fatigue failure is prevented. Moreover, if the bending modulus of elasticity is not less than 1000 $kgf/cm^2$ and not more than 5000 $kgf/cm^2$, the sliding property is increased.

Herein, it is needed that the guide device for use with the rolling element interference preventer of the invention has a pair of bearing races, and the continuous circulation path for the rolling elements rolling with a load applied between the pair of bearing races, and the guide device may be a linear guide device for endless track, a swing bearing, a ball screw, and a spline, for example.

And the rolling element interference preventer of this invention can take various forms, depending on the type of guide device to which it is applied. For example, in a case where the guide device is a linear guide device for endless track having a track rail (one bearing race) having a rolling path, a sliding board (other bearing race) having a rolling groove mutually opposed to the rolling path and moving along the track rail, and a number of rolling elements rolling with a load applied between the rolling path of the track rail and the rolling groove of the sliding board, it is preferred that the rolling element interference preventer consists of a flexible resin connector having an interposing portion interposed between each rolling elements, and a connecting portion for connecting each interposing portions, and preferably can hold a number of rolling elements rollably by the interposing portions and the connecting portion.

Moreover, in the case where the rolling element interference preventer is made up of this flexible resin connector, the resin connector may be provided with a chamfer guide portion at either terminal end to guide the top end portion of the resin connector, whereby when the guide device is moved in the continuous circulation path, especially when the top end portion of the rolling element interference preventer enters a direction converting path of the circulation path, or exits from the direction converting path, the top end portion is guided to move the guide device smoothly. By forming the chamfer guide portion at either terminal end of the resin connector, the rolling element interference preventer can be guided smoothly in any of forward and backward directions in the reciprocating motion of the guide device.

The length of the rolling element interference preventer to be molded is decided in consideration of the length of the circulation path for the guide device using it. However, if the guide device is increased in size and the length of circulation path is great, the rolling element interference preventer may be divided into two or three for molding, whereby the size of mold can be reduced. In this case, each resin connector constituting each of two or three parts divided from the rolling element interference preventer is formed with a chamfer guide portion at either terminal end.

In the case where the rolling element interference preventer of the invention is applied to the linear guide device for endless track, if the rolling elements are balls, the thermoplastic resin elastomer forming the resin connector has the properties that the 10% elongation stress A is from 60 to 150 $kgf/cm^2$, and preferably from 90 to 130 $kgf/cm^2$, the tensile strength B is from 340 to 400 $kgf/cm^2$, and preferably from 350 to 380 $kgf/cm^2$, and the bending modulus of elasticity C is from 1000 to 2000 $kgf/cm^2$, and preferably from 1200 to 1800 $kgf/cm^2$. By employing the values in the above ranges for the 10% elongation stress A, tensile strength B and bending modulus of elasticity C, the ball interference preventer can exhibit the excellent and balanced performances (low noise, maintenance free for long term, high speed, sliding property, durability and wear resistance).

In the case where the rolling element interference preventer of this invention is applied to the linear guide device for endless track, if the rolling elements are rollers, the thermoplastic resin elastomer forming the resin connector has the properties that the 10% elongation stress A is from 80 to 200 $kgf/cm^2$, and preferably from 100 to 160 $kgf/cm^2$, the tensile strength B is from 380 to 460 $kgf/cm^2$, and preferably from 430 to 460 $kgf/cm^2$, and the bending modulus of elasticity C is from 1500 to 5000 $kgf/cm^2$, and preferably from 2000 to 4000 $kgf/cm^2$. By employing the values in the above ranges for the 10% elongation stress A, tensile strength B and bending modulus of elasticity C, the roller interference preventer can exhibit the excellent and balanced performances (low noise, maintenance free for long term, high speed, sliding property, durability and wear resistance).

Moreover, in the case where the guide device is a ball screw having a screw axis (one bearing race) with a helical rolling path for a ball, a nut (other bearing race) with a helical rolling groove mutually opposed to the helical rolling path, and a number of balls rolling with a load applied between the helical rolling path of the screw axis and the helical rolling groove of the nut, the ball interference preventer may be the resin connector like that of the linear guide device for endless track, or a spacer interposed between each balls.

The rolling element interference preventer of this invention can be produced by conventional well-known methods, using the thermoplastic resin elastomer as described above. For example, in a case where the rolling element interference preventer is made up of the resin connector, a number of rolling elements can be produced as a core by injection molding or a so-called insert molding (as described in JP-A-6-56181, JP-A-5-52217, JP-A-5-126149, JP-A-5-196036, JP-A-5-196037, and JP-A-9-14264), or other methods.

DETAILED DESCRIPTION OF THE PREFERRED EMBODIMENTS

The preferred embodiments of the present invention will be described below with reference to the accompanying drawings.

First Embodiment

FIGS. 1 to 6 show a roller interference preventer RC according to a first embodiment of the invention and a linear sliding roller bearing having incorporated the roller interference preventer RC.

Figure 6:
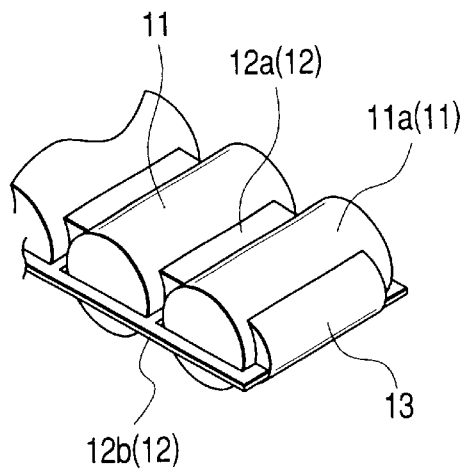
FIG. 6 is an enlarged perspective view showing a top end portion of the roller interference preventer shown in FIG. 3.

This roller interference preventer RC includes a flexible resin connector 12 having interposing portions 12a interposed between each of a number of rollers 11 made of bearing steel (SUJ2) disposed at regular intervals, and a pair of connecting portions 12b connecting each interposing portions 12a, and carrying a number of rollers 11 in linear state and rollably, as shown particularly in FIGS. 3 to 6. At either terminal end of the resin connector 12, a chamfer guide portion 13 having an almost similar shape of a roller 11a is formed to surround the roller 11a located at the terminal end, as shown in FIG. 6.

Figure 1:
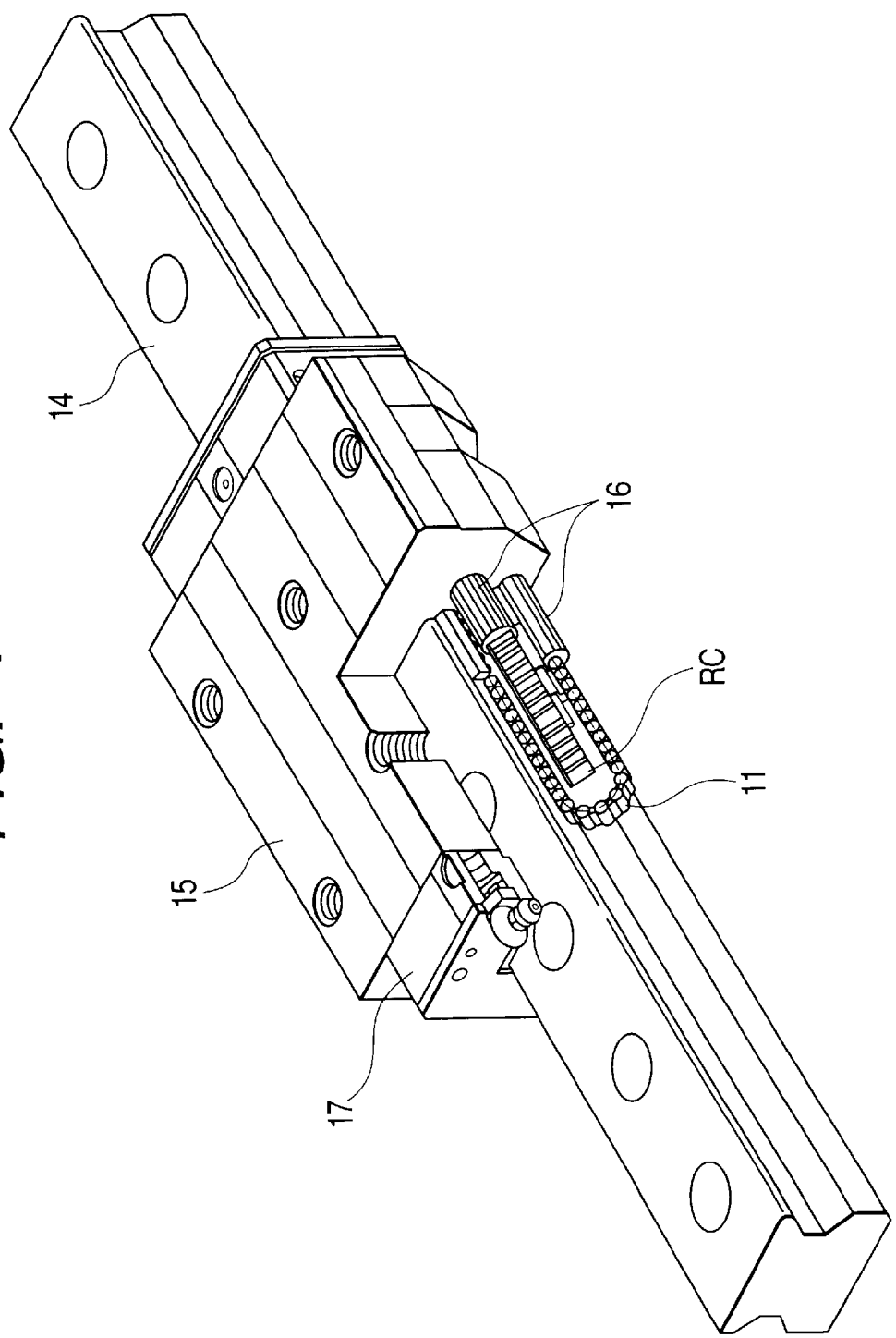
FIG. 1 is a perspective and detailed portion broken view, showing a linear sliding roller bearing having incorporated a roller interference preventer according to a first embodiment of the prevent invention.
Figure 2:
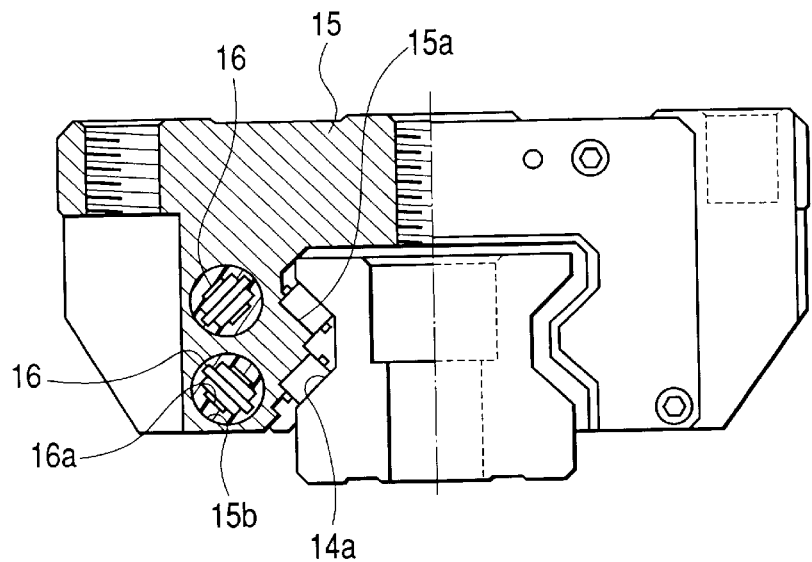
FIG. 2 is a partial cross-sectional side view of the linear sliding roller bearing of FIG. 1.
Figure 3:
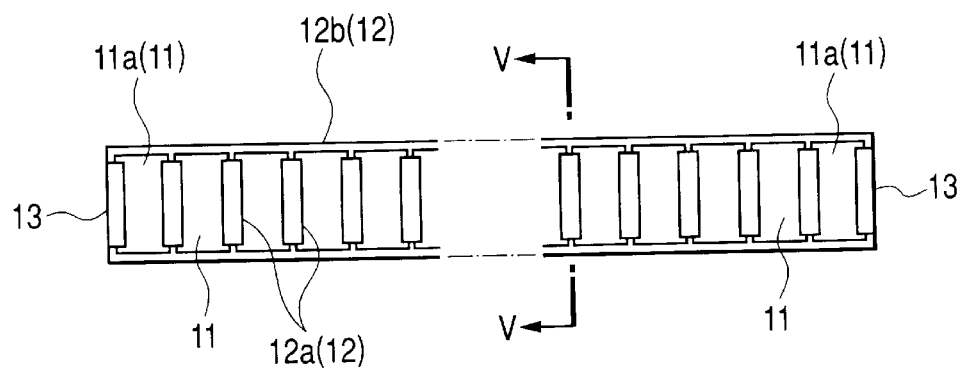
FIG. 3 is a plan view showing the roller interference preventer of FIG. 1.
Figure 4:
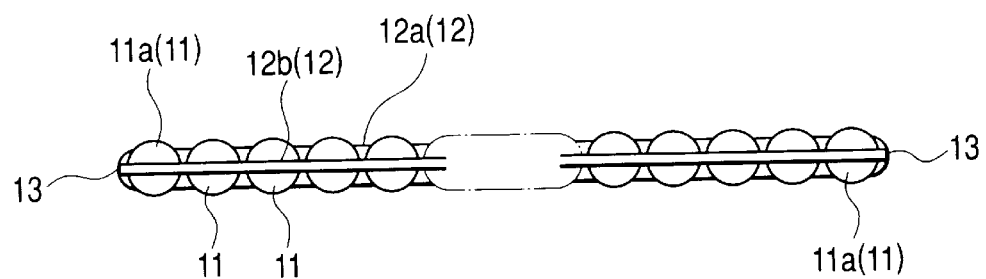
FIG. 4 is a front view of the roller interference preventer of FIG. 3.
Figure 5:
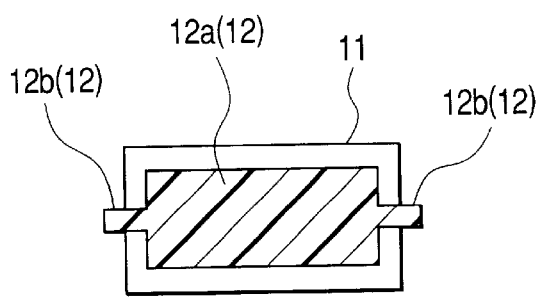
FIG. 5 is a cross-sectional view of the roller interference preventer, taken along the line V—V in FIG. 3.

The linear sliding roller bearing having incorporated the roller interference preventer RC fundamentally includes a metallic track rail (one bearing race) 14 having rigidity, a metallic sliding board (other bearing race) 15 having rigidity, a roller guide member 16 made of synthetic resin and attached in a hole 15b punched along the longitudinal direction in the sliding board 15, a lid 17 made of synthetic resin and attached on the sliding board 15 together with the roller guide member 16, and a number of rollers 11 carried like a chain by the resin connector 12, as shown in FIGS. 1 and 2.

In this first embodiment, the track rail 14 is formed with a plain surface-like rolling path 14a for the roller 11 at either shoulder portion, and the sliding board 15 is formed with a load roller rolling path 15a for the roller 11 applying a load. Further, the roller guide member 16 is formed with a no-load roller guide bore 16a for guiding the roller 11 to roll in no-load state, and the lid 17 is formed with a direction converting path, not shown, constituting the continuous circulation path of the roller 11 by linking the load roller rolling path 15a of the sliding board 15 and the no-load roller guide bore 16a of the roller guide member 16.

Second Embodiment

Figure 7:
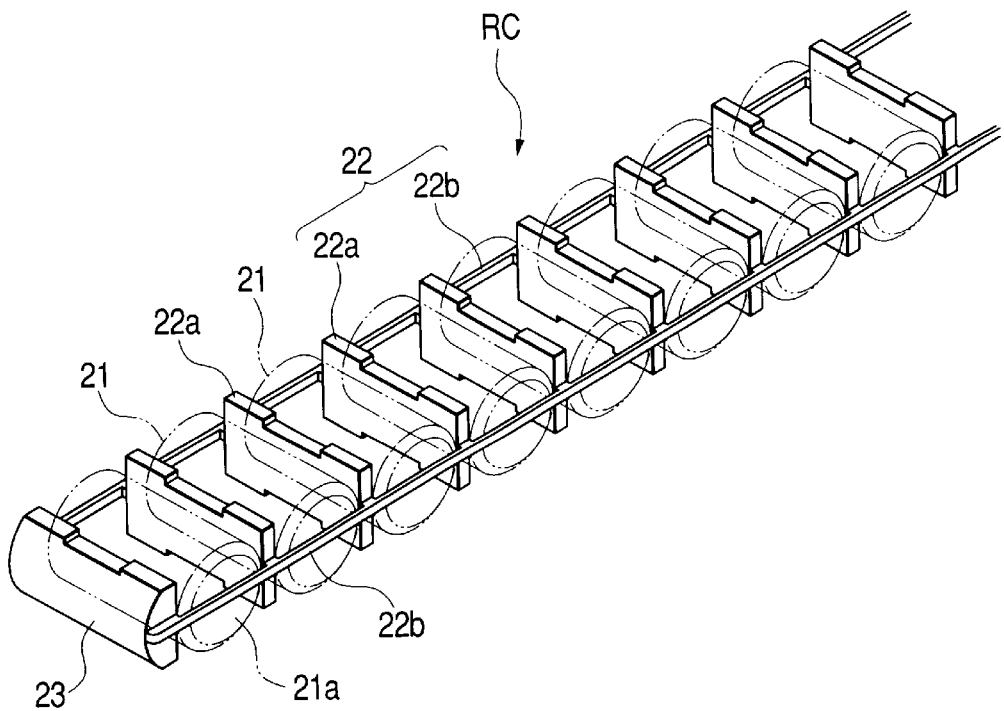
FIG. 7 is a perspective view showing a roller interference preventer according to a second embodiment of the invention.
Figure 8:
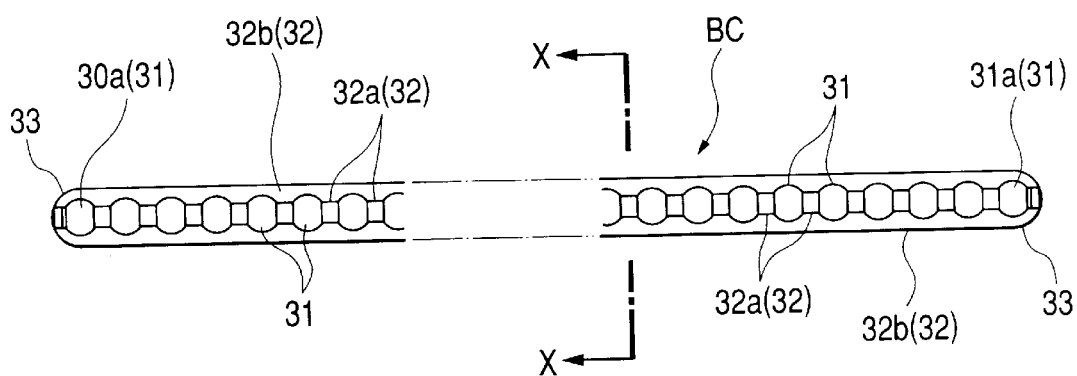
FIG. 8 is a plan view showing a ball interference preventer according to a third embodiment of the invention.
Figure 9:
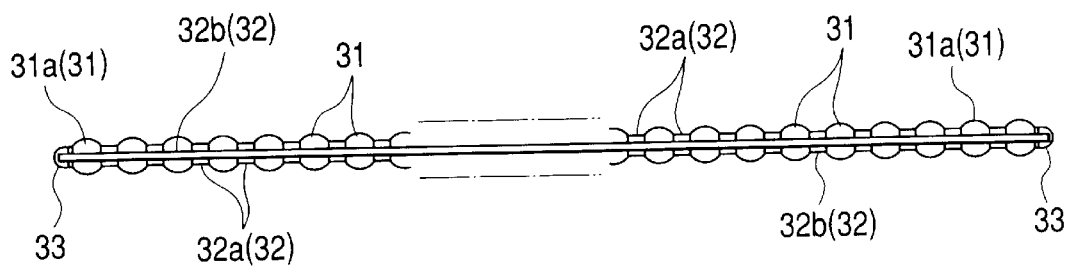
FIG. 9 is a front view of the ball interference preventer of FIG. 8.
Figure 10:
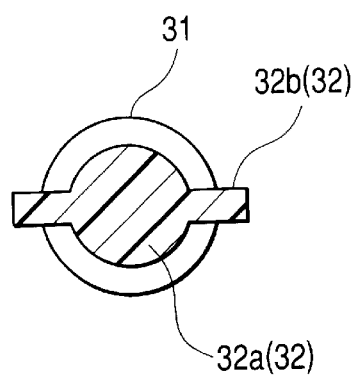
FIG. 10 is a cross-sectional view of the ball interference preventer, taken along the line X—X in FIG. 8.
Figure 11:
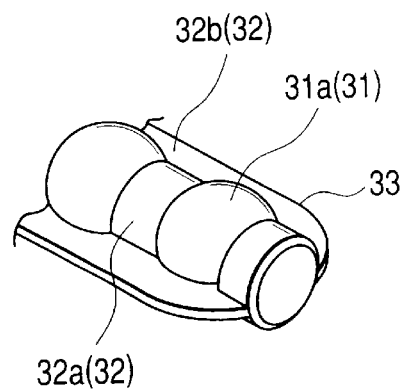
FIG. 11 is an enlarged perspective view showing a top end portion of the ball interference preventer shown in FIG. 8.
Figure 12:
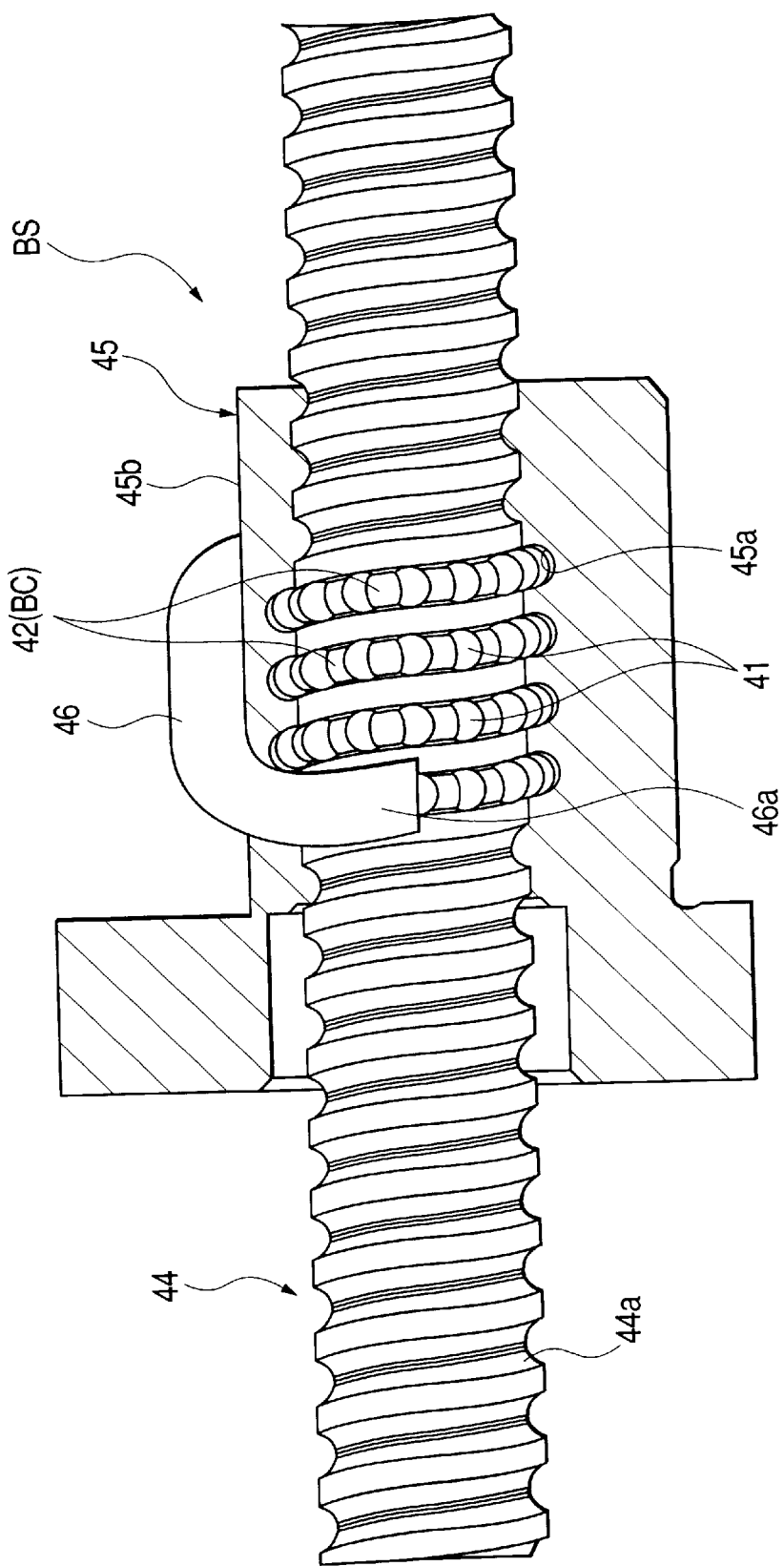
FIG. 12 is a cross-sectional view of a ball screw having incorporated a ball interference preventer according to a fourth embodiment of the invention.
Figure 13:
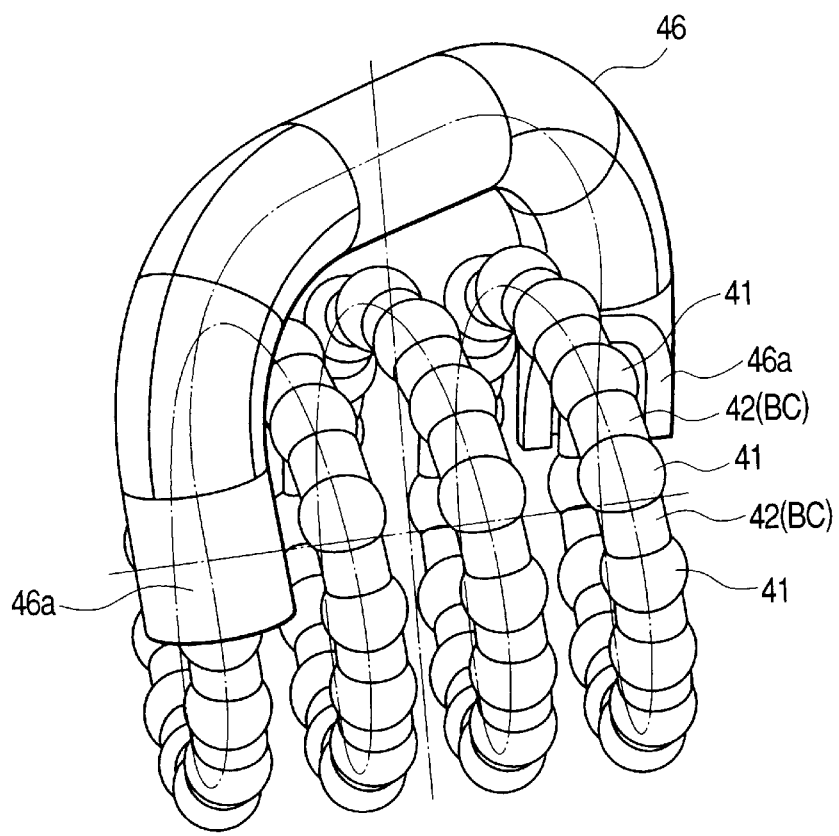
FIG. 13 is a perspective view showing how the balls of FIG. 12 circulate.
Figure 14:
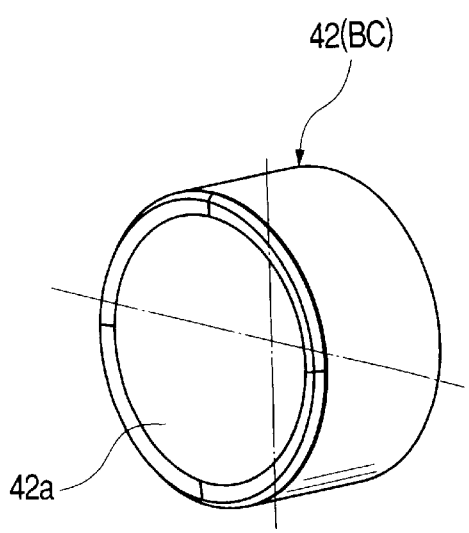
FIG. 14 is a perspective view showing the ball interference preventer (spacer) of FIG. 12.
Figure 15:
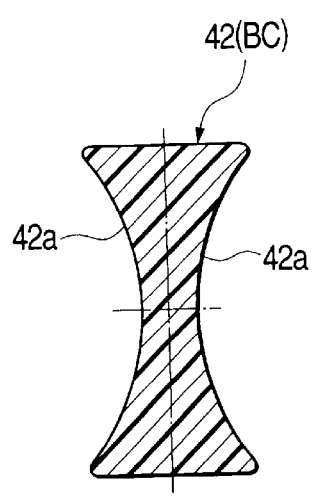
FIG. 15 is a cross-sectional view of the ball interference preventer of FIG. 14.

FIG. 7 shows a roller interference preventer RC according to a second embodiment of the invention. This roller interference preventer RC includes of a flexible resin connector 22 having plate-like interposing portions 22a interposed between each of a number of rollers 21 made of bearing steel (SUJ2) disposed at regular intervals, and a pair of connecting portions 22b connecting each interposing portions 22a on either side of the roller 21, and arranging a number of rollers 21 in linear state and rollably. At either terminal end of the resin connector 22, a chamfer guide portion 23 having a semi-cylindrical shape and the almost same radius of curvature as the roller 21a is formed.

The roller interference preventer RC according to the second embodiment does not carry the rollers 21 by using the resin connector 22, but is incorporated into the continuous circulation path of the linear sliding roller bearing in the same manner as the roller interference preventer RC of the first embodiment, whereby the rollers 21 are prevented from contacting and interfering with each other.

Third Embodiment

FIGS. 8 to 11 shows a ball interference preventer BC according to a third embodiment of the invention. This ball interference preventer BC includes of a flexible resin connector 32 having interposing portions 32a interposed between each of a number of balls 31 made of bearing steel (SUJ2) disposed at regular intervals, and a pair of connecting portions 32b for connecting each interposing portions 32a, and carrying a number of balls 21 in linear state and rollably. At either terminal end of the resin connector 32, a chamfer guide portion 33 having the almost same shape as the ball 31a is formed to surround the ball 31a located at the terminal end.

This ball interference preventer BC is also incorporated into the continuous circulation path of the linear sliding ball bearing in the same manner as the roller interference preventer RC of the first embodiment.

Fourth Embodiment

FIGS. 12 to 15 show a ball interference preventer BC according to a fourth embodiment of the invention and a ball screw BS with the ball interference preventer BC incorporated.

This ball interference preventer BC includes a number of spacers 42 having a spherical concave portion 42a for receiving a ball 41 partly on the front face and the rear face. The ball interference preventer BC is incorporated into a continuous circulation path of the ball screw including a screw axis (one bearing race) 44 having a helical rolling path 44a for the ball 41, a nut (other bearing race) 45 with a helical rolling groove 45a mutually opposed to the helical rolling path, and a number of balls 41 rolling between the helical rolling path 44 of the screw axis 44 and the helical rolling groove 45a of the nut 45 with a load applied, and is placed between adjacent balls 41 to prevent the balls 41 from contacting and interfering with each other.

In this fourth embodiment, the nut 45 has a return pipe 46 of almost U-character shape attached on a clamp face 45b formed by cutting away a part of the outer circumferential portion. Both end portions of the return pipe 46 penetrate through a peripheral wall of the nut 44 to open into the helical rolling groove 45a mutually opposed to the helical rolling path 44a of the screw axis 44. Further, at either end, ball pickup portions 46a are formed to pick up the balls 41 rolling between the helical rolling path 44a and the helical rolling groove 45a with a load applied into the return pipe 46, and to feed the balls 41 rolling through the return pipe 46 to between the helical rolling path 44a and the helical rolling groove 45a. The continuous circulation path of the ball 41 is made up of the screw axis 44, the nut 45 and the return pipe 46.

The spacer 42 constituting the ball interference preventer BC of the fourth embodiment is located between adjacent balls 41 incorporated into the continuous circulation path of the ball screw, circulates in this circulation path together with the balls 41, and prevents the balls 41 from contacting and interfering with each other.

Fifth Embodiment

Figure 16:
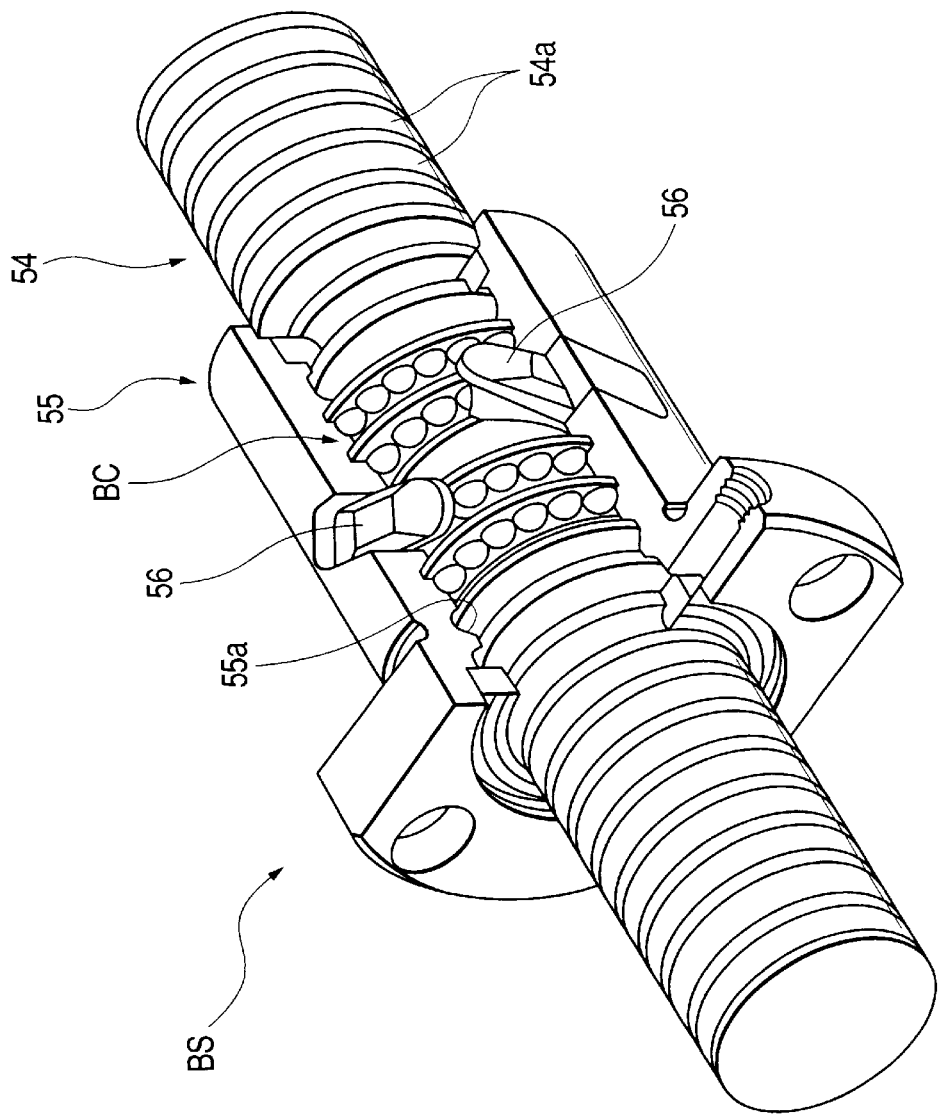
FIG. 16 is a perspective and detailed portion broken view, showing a ball screw having incorporated a ball interference preventer according to a fifth embodiment of the invention.
Figure 17:
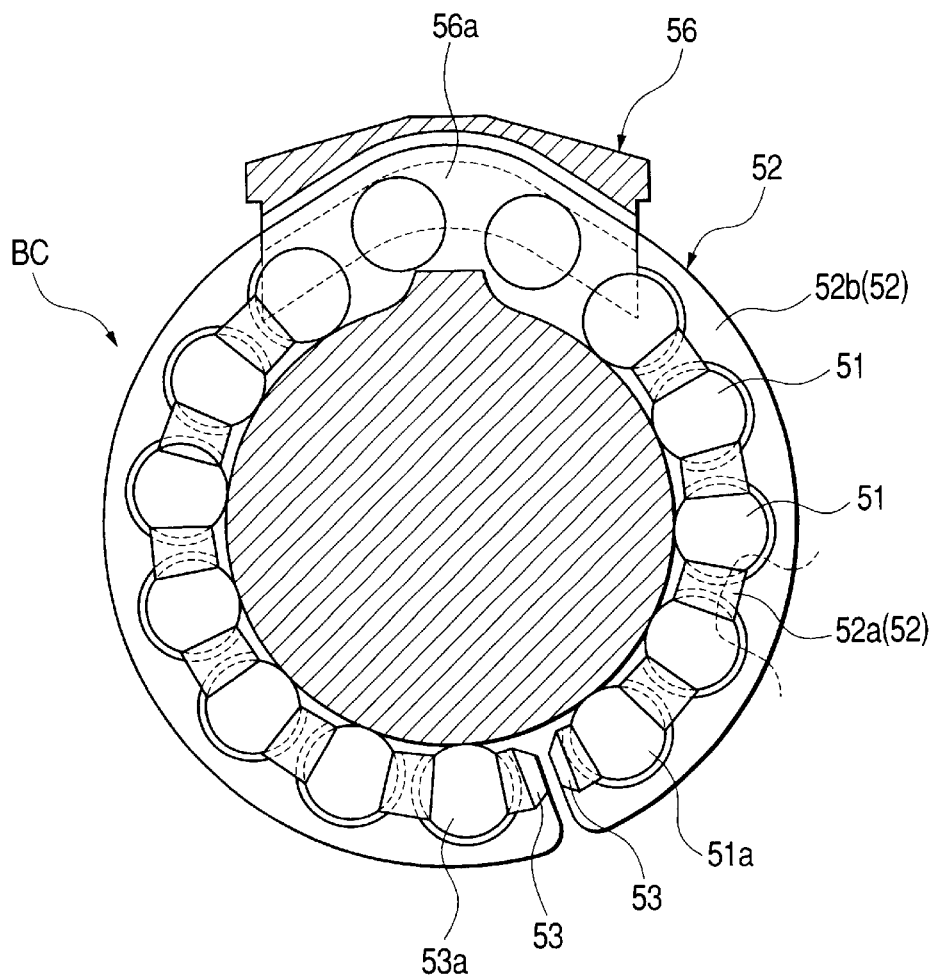
FIG. 17 is a plan view showing a state in which the ball interference preventer incorporated into the ball screw of FIG. 16 circulates in the ball circulation path.
Figure 18:
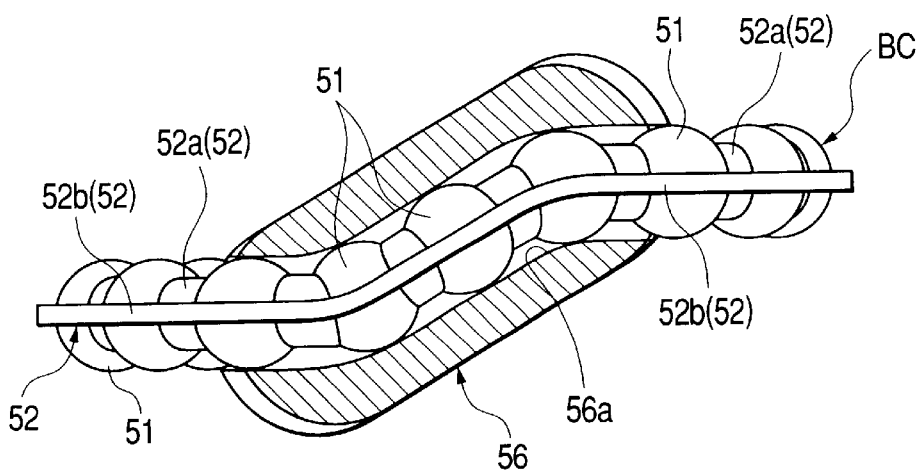
FIG. 18 is a perspective view showing a state in which the ball interference preventer incorporated into the ball screw of FIG. 16 circulates in the ball circulation path.

FIGS. 16 to 18 show a ball interference preventer BC incorporated into a ball screw BS in the same manner as in the fourth embodiment of the invention.

This ball interference preventer BC, unlike that of the fourth embodiment but like that of the third embodiment, includes a flexible resin connector 52 having interposing portions 52a interposed between each of a number of balls 51 disposed at regular intervals, and a connecting portion 52b connecting each interposing portions 52a, and carrying a number of balls 51 rollably. At either terminal end of the resin connector 52, there is formed a chamfer guide portion 53 to surround the ball 51a located at the terminal end.

In FIGS. 16 to 18, the ball rolling groove 54a is formed in the screw axis 54, and the no-load rolling groove 55a is formed in the nut 55. Further, a deflector 56 attached to the nut 54 and forming the continuous circulation path between the screw axis 54 and the nut 55 is formed with a ball return groove 56a, whereby a number of balls connected by the resin connector 52 can roll in the circulation path formed by the ball rolling groove 54a of the screw axis 54, the no-load rolling groove 55a of the nut 55, and the ball return groove 56a of the deflector 56, with a load applied.

This ball interference preventer BC of the fifth embodiment prevents the balls 51 from contacting and interfering with each other, like the ball interference preventer BC of the fourth embodiment.

EXAMPLES

The present invention will be described below more specifically on the basis of some experimental examples (examples and comparative examples).

Experimental Examples 1 to 4

Using polyester resin elastomer (tradename Perplene EN1000, EN2000, EN3000 and EN5000 made by TOYOBO Co., Ltd.) as listed in Table 1 as the thermoplastic resin elastomer, 75 rollers made of bearing steel (SUJ2) as large as 4 mm$\phi$×7 mm were produced as a core by injection molding, and released from the mold, together with a number of rollers, thereby molding the roller interference preventer having a length of about 340 mm and a shape as shown in FIGS. 3 to 6 for the first embodiment.

The obtained roller interference preventer of each of experimental examples 1 to 4 was investigated for the durability, sliding property, wear resistance, water absorptivity, swelling property and water resistance.

The results are listed below in Table 1.

Durability

As shown in FIGS. 1 and 2, the roller interference preventer of each of experimental examples 1 to 4 was incorporated into the continuous circulation path of the linear sliding roller bearing, with its track rail fixed, and the sliding board was reciprocated under the conditions with a speed f of 200 m/min, a stroke St of 2500 mm, and acceleration 1G. The durability was evaluated at three levels, in which ○ indicates no abnormality after running 30,000 km, Δ indicates some damage in part after running 30,000 km but no abnormality for running, and x indicates abnormality such as breakage after running less than 30,000 km.

Sliding Property

In the same manner as the measurement of durability, the roller interference preventer of each of experimental examples 1 to 4 was incorporated into the continuous circulation path of the linear sliding roller bearing, with its track rail fixed, and the sliding board was pushed by a load cell to measure the rolling resistance of the sliding board in the track rail at a sampling frequency of 500 Hz for this load cell. The sliding property was evaluated at three levels, in which ○ is suitable for service because the resistance variation is 25% or less of the rolling resistance, Δ is usable for service though the resistance variation is beyond 25% of the rolling resistance in part, and x is unusable because the resistance variation is totally beyond 25% of the rolling resistance.

Wear Resistance

In the same manner as the measurement of durability, the roller interference preventer of each of experimental examples 1 to 4 was incorporated into the continuous circulation path of the linear sliding roller bearing, with its track rail fixed, and the sliding board was reciprocated under the conditions with a speed f of 200 m/min, a stroke St of 2500 mm, and acceleration 1G to measure the wear amount at the top end corner of the resin connector for the roller interference preventer. The wear resistance was evaluated at three levels, in which ○ is no abnormality in wear, Δ is some initial wear but no progressive wear, and x is progressive wear at the top end while running to lead to breakage.

Water Absorptivity

Using four kinds of polyester resin elastomer employed in each of the experimental examples 1 to 4 as listed in Table 1, a dumbbell specimen of JIS 3 type was produced in conformance with JIS K6251, and the size variation of the dumbbell specimen was measured in the environment of equilibrium moisture percentage 23° C., 65% RH, and the water absorptivity was evaluated at three levels in which ○ is 0.5% or less, Δ is from 0.5% to 1.5%, and x is more than 1.5%.

Swelling Property

In the same manner as the test of water absorptivity, a dumbbell specimen of JIS 3 type was produced, and the dumbbell specimen was immersed in the test oil at a temperature of 85° C. for 672 hours, employing synthetic coolant (Synthylo made by Castorol), soluble coolant (Microcut 3850-LH made by Japan Quakerchemical), and emulsion coolant (Yushiroken EC50T-3 made by Yushiro Chemical Industries) as test oils, and using an environmental test machine (made by KATO: SSE740RA). The swelling factor was calculated from the values of size variation of the dumbbell specimen due to swelling and evaluated at three levels in which ○ is 1.5% or less, Δ is from 1.5% to 3%, and x is more than 3%.

Water Resistance

In the same manner as the test of water absorptivity and swelling property, a dumbbell specimen of JIS3 type was produced, and immersed in the boiling water at 100° C. for ten days to measure the tensile strength change (tensile strength: 500 mm/min) of the dumbbell specimen. The tensile strength retention was calculated from this tensile strength change, and evaluated at three levels in which ○ is the tensile strength retention of 80% or more after ten days, Δ is the tensile strength retention from 70% to 80% after ten days, and x is the tensile strength retention of less than 70% after ten days.

Experimental Examples 5 to 9

Using polyester resin elastomer (tradename Perplene EN1000, EN2000, EN3000 and EN5000 made by TOYOBO Co., Ltd.) as listed in Table 2 as the thermoplastic resin elastomer, a 10% elongation stress a of 54 kgf/cm$^2$, a tensile strength b of 220 kgf/cm$^2$, a bending modulus of elasticity c of 1100 kgf/cm$^2$, (A×B)÷C=10.8), 34 balls made of bearing steel (SUJ2) as large as 3.969 mmφ were produced as a core by injection molding, and released from the mold, together with a number of balls, thereby molding the ball interference preventer with a shape as shown in FIGS. 8 to 11.

The obtained ball interference preventer of each of experimental examples 5 to 9 was investigated for the durability, sliding property, wear resistance, water absorptivity, swelling property and water resistance in the same manner as in the previous experimental examples 1 to 4.

The results are listed below in Table 2.

TABLE 1

Roller interference preventer

| Experimental example No. | | 1 | 2 | 3 | 4 |
|---|---|---|---|---|---|
| Polyester resin elastomer | Elastomer trade name | | Perplene | | |
| | Grade | EN1000 | EN2000 | EN3000 | EN5000 |
| | 10% elongation stress (kgf/cm$^2$) | 69 | 80 | 158 | 193 |
| | Tensile strength (kgf/cm$^2$) | 360 | 370 | 430 | 455 |
| | Bending modulus of elasticity (kgf/cm$^2$) | 1200 | 1600 | 2700 | 4800 |
| | Value of (A × B) ÷ C | 20.7 | 18.5 | 25.2 | 18.2 |
| Evaluation | Durability | ○ | Δ | ○ | ○ |
| | Sliding property | ○ | ○ | ○ | Δ |
| | Wear resistance | ○ | ○ | ○ | Δ |
| | Water absorptivity | ○ | ○ | ○ | ○ |
| | Swelling property | Δ | ○ | ○ | ○ |
| | Water resistance | Δ | ○ | ○ | ○ |

TABLE 2 ball interference preventer

| Experimental example No. | | 5 | 6 | 7 | 8 | 9 |
|---|---|---|---|---|---|---|
| Polyester resin elastomer | Elastomer trade name | | Perplene | | | — |
| | Grade | EN1000 | EN2000 | EN3000 | EN5000 | |
| | 10% elongation stress (kgf/cm$^2$) | 69 | 80 | 158 | 193 | 54 |
| | Tensile strength (kgf/cm$^2$) | 360 | 370 | 430 | 455 | 220 |
| | Bending modulus of elasticity (kgf/cm$^2$) | 1200 | 1600 | 2700 | 4800 | 1100 |
| | Value of (A × B) ÷ C | 20.7 | 18.5 | 25.2 | 18.2 | 10.8 |
| Evaluation | Durability | Δ | ○ | ○ | Δ | Δ |
| | Sliding property | ○ | ○ | Δ | Δ | ○ |
| | Wear resistance | ○ | ○ | ○ | Δ | ○ |
| | Water absorptivity | ○ | ○ | ○ | ○ | Δ |
| | Swelling property | Δ | ○ | ○ | ○ | x |
| | Water resistance | ○ | ○ | ○ | ○ | Δ |

With the rolling element interference preventer of the invention, in the guide device incorporating it, it is possible to exhibit the excellent low noise, maintenance free for long term, high speed and sliding property, and at the same time, the excellent durability and wear resistance, whereby the guide device can be stably employed over long term to deal with the reduction in size and increase in speed.

What is claimed is:

1. A rolling element interference preventer for a guide device having a continuous circulation path and a plurality of rolling elements rolling at regular intervals in the continuous circulation path, wherein the rolling element interference preventer prevents the rolling elements from interfering with each other, and wherein the rolling element interference preventer is formed of a thermoplastic resin elastomer having a physical property in accordance with an expression, $(A \times B) \div C \geqq 18$, where A represents a 10% elongation stress, B represents a tensile strength, and C represents a bending modulus of elasticity.

2. The rolling element interference preventer according to claim 1, wherein the thermoplastic resin elastomer has the 10% elongation stress A of 60 to 200 kgf/cm$^2$, the tensile strength B of 340 to 460 kgf/cm$^2$, and the bending modulus of elasticity C of 1000 to 5000 kgf/cm$^2$.

3. The rolling element interference preventer according to claim 1, wherein a coefficient of water absorption for the thermoplastic resin elastomer is not more than 1.5 wt %.

4. The rolling element interference preventer according to claim 1, wherein a swelling factor of the thermoplastic resin elastomer is not more than 3%.

5. The rolling element interference preventer according to claim 1, wherein a tensile strength retention of the thermoplastic resin elastomer is not less than 70% after ten days in 100° C. boiling water immersion test.

6. A guide device comprising:

a track rail having a rolling path;

a sliding board having a rolling groove opposed to the rolling path and moving along the track rail;

a plurality of rolling elements rolling with a load applied between the rolling path and the rolling groove; and a rolling element interference preventer including a flexible resin connector having a plurality of interposing portions interposed between each rolling elements, and a connecting portion for connecting each interposing portions, wherein the rolling element interference preventer is formed of a thermoplastic resin elastomer having a physical property in accordance with an expression, $(A \times B) \div C \geqq 18$, where A represents a 10% elongation stress, B represents a tensile strength, and C represents a bending modulus of elasticity.

7. The guide device according to claim 6, wherein the resin connector carries the rolling elements in an arranged state and rollably by the interposing portions and the connecting portion.

8. The guide device according to claim 6, wherein the rolling elements are balls, and the thermoplastic resin elastomer has the 10% elongation stress A of 60 to 100 kgf/cm$^2$, the tensile strength B of 340 to 400 kgf/cm$^2$, and the bending modulus of elasticity C of 1000 to 2000 kgf/cm$^2$.

9. The guide device according to claim 6, wherein the rolling elements are rollers, and the thermoplastic resin elastomer has the 10% elongation stress A of 80 to 200 kgf/cm$^2$, the tensile strength B of 380 to 460 kgf/cm$^2$, and the bending modulus of elasticity C of 2000 to 5000 kgf/cm$^2$.

* * * * *